May 26, 1970 J. M. MALEK 3,514,263
FLUIDIZED BED CRYSTALLIZATION DEVICE

Original Filed Feb. 4, 1965

May 26, 1970  J. M. MALEK  3,514,263
FLUIDIZED BED CRYSTALLIZATION DEVICE
Original Filed Feb. 4, 1965  2 Sheets-Sheet 2
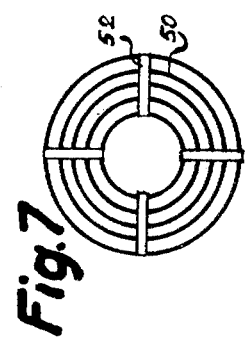
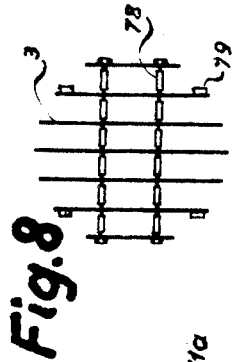
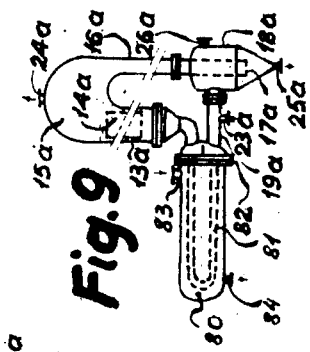
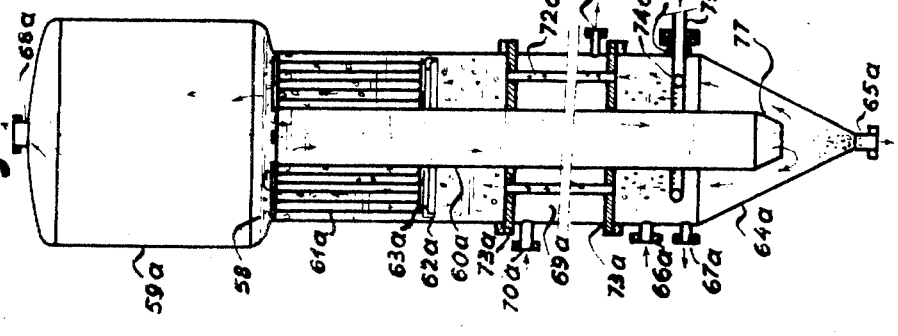
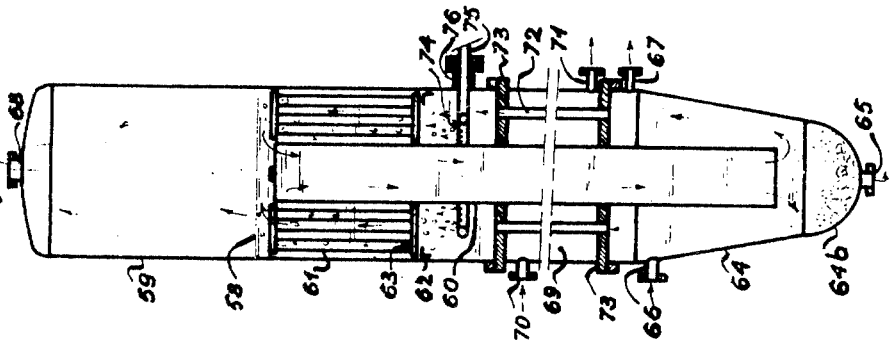
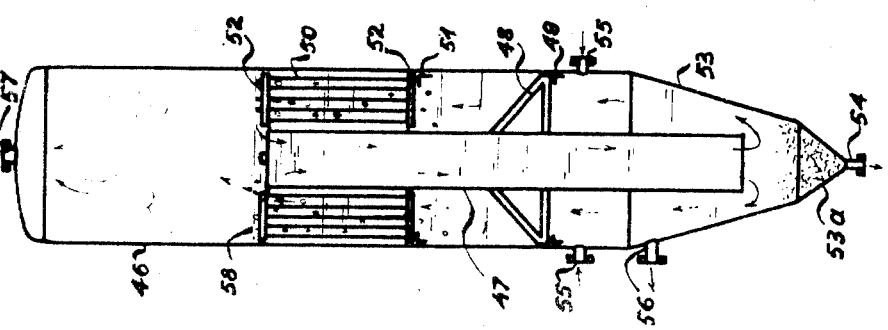

United States Patent Office 3,514,263
Patented May 26, 1970

3,514,263
FLUIDIZED BED CRYSTALLIZATION DEVICE
Jan Michal Malek, 11 Rue Spontini,
Paris, France
Continuation of application Ser. No. 430,434, Feb. 4,
1965. This application June 23, 1969, Ser. No. 838,039
Int. Cl. B01d 9/00, 9/02
U.S. Cl. 23—273                    13 Claims

ABSTRACT OF THE DISCLOSURE

A fluidized bed crystallization device consisting of a column into which is introduced a liquor to be evaporated and crystallized. An assembly of spaced vertical walls is disposed in the upper part of the column for avoiding hydraulic hammer effects and for impeding the interfusion of upwardly moving vapor bubbles. A chamber is positioned at the head of the column for separating liquid and vapor phases, and an outlet is provided for the exhaust of the separated vapors. A pipe is connected to the base of the chamber for recycling liquid separated in the above-noted chamber. There is further provided a vertical classifying vessel communicating with the recycling pipe and of a particular form and connected to the recycling pipe to permit classification of crystallized grains in suspension in the treated liquid under the action of liquid current from the recycling pipe. Outlets are provided for the heavy crystalline grains and for decanted mother-liquor. The head of the classifying vessel is connected to the base of the column.

---

This application is a continuation of application No. 430,434, filed Feb. 4, 1965.

The present invention relates to crystallizers and more particularly to a device for crystallization in a fluidized bed in a liquid medium.

The main object of the present invention is to make cheaper the construction and the utilization of devices of the above-noted type.

According to the invention, a fluidized bed crystallization device consists of a column for the evaporation in the upper part of said column of a solution to be crystallized, said device comprising, preferably, an inlet for said solution and said column comprising, at its head, an assembly of substantially vertical walls separated from each other for avoiding hydraulic hammer effects in the liquid content of the column and for impeding the interfusion of the upwardly moving vapor bubbles, this column ending at its head in a chamber for separating the vapor and liquid phases, which chamber is provided, at its top part, with an outlet for the separated vapors and is connected, at its base, to a pipe for recycling the liquid freed from vapors in said chamber, the base of said recycling pipe communicating with a classifying preferably cylindrical vessel disposed vertically and the lower part of which is progressively narrowed down for forming a bottom with a low point, the communication of said recycling pipe with said vessel being set at a predetermined level above said low point in order to allow a classification of the crystallized grains in suspension in the treated liquor, which classification is realized under the action of the liquid current from the recycling pipe in the fluidized bed formed in said vessel by the grains in suspension in the liquor, said vessel being provided, at said low point, with an outlet for the crystalline grains classified as the heaviest grains and, at its upper part, with an outlet for the decanted mother-liquor, the upper part of said vessel being connected to the base of said column.

According to a first alternative, the separation chamber has a knee-shape and the recycling pipe is disposed outside of the column and penetrates into the classifying vessel substantially coaxially therewith, said vessel being connected to the base of the column by means of a short connecting pipe, the whole device constituting a closed circuit generally shaped as O and D letters extending in the vertical direction.

According to another alternative, the recycling pipe is located inside the column and coaxially therewith, the top of the classifying vessel being directly connected to the base of said column to form an entity with the column.

The assembly of substantially vertical walls impedes efficiently the interfusion of the upwardly moving vapor bubbles, slows down the bubble rising and facilitates the bubble dispersion, in order to reduce the average specific weight of the mixed liquid-vapor and to increase, in consequence, the circulation motive power, on the one hand, and to avoid hydraulic hammer effects in the column, on the other hand.

The device may comprise a means for introducing into the column a light fluid such as vapors or some neutral gas such as air, relatively compressed and, preferably, previously saturated with the vapors of the liquor treated, under a temperature equal or close to, or greater than that of this liquor, this means being situated beneath the level of the vertical wall assembly in the column.

The device may further comprise an enclosure for heating or superheating the liquor in the device itself, this enclosure, such as a shell containing a bundle of steam heated tubes, being located, on the one hand, at a level higher than that of the communication between the recycling pipe and the classifying vessel, in order to permit the formation of a fluidized bed in the area of the bottom of the classifying vessel and, on the other hand, at a sufficiently low level in the column so that the hydrostatic pressure exerted by the liquor above said enclosure impedes the ebullition of the liquor in contact with the walls of the heating enclosure, such an ebullition involving a possible liquor concentration at this point and a crystallization which could result in deposits prejudicial to the heat transfer, on these walls.

The description which follows with reference to the accompanying drawings given as non limiting examples will make readily understood how the invention can be carried into practice and will illustrate further particularities thereof.

In the drawings:

FIGS. 4, 5 and 6 are schematic elevation sectional views of the embodiments of the same device, as per the second alternative of the invention;

FIGS. 7 and 8 are schematic cross-sections of two embodiments of the vertical walls assembly for bubbling gas through the device; and FIG. 9 shows schematically an alternative to the device shown in FIG. 2.

Figure 1:
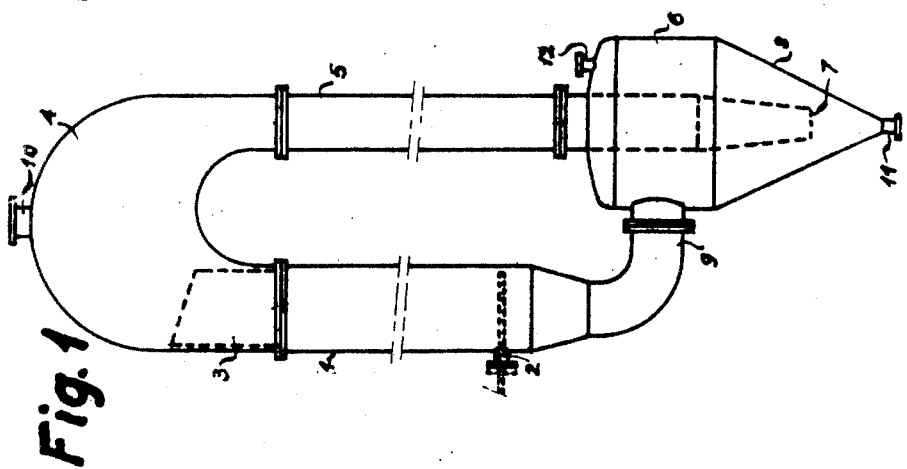

In the embodiment of FIG. 1, the device is specially designed for treatment of a crystallizing liquor arriving in a superheated state. It comprises a column 1 having an inlet 2 for supplying the device with the liquor to be treated; this supplying can be carried out through a perforated tube forming bubbler and passing through this nozzle. This column comprises an assembly of vertical walls 13 for dispersion of steam bubbles. The column is larger at its top part and extended by a chamber 4 for gaseous liquid phases separation, which chamber connects the column to a pipe 5 recycling the crystallizing liquor to a classifying vessel 6 wherein this pipe is narrowed at its end by an orifice 7 placed in the area of a conical bottom 8 so as to allow the decantation and classification of crystalline grains leaving the orifice 7 together with the liquor. This classification allows the heaviest grains to deposit at the lower point of the bottom and the lightest grains to be carried along by the liquid current to the elbow 9 connecting the classifying vessel 6 to the lower base of the column 1. The outlet 10 on the chamber 4 allows the vapor exhaust. The discharge 11 at the lowest point of the classifying vessel 6 allows the biggest and relatively even crystals to be drained off from the device. Lastly, the mother-liquor decanted in the classifier 6 can be drawn off from said vessel through the outlet 12.

Figure 2:
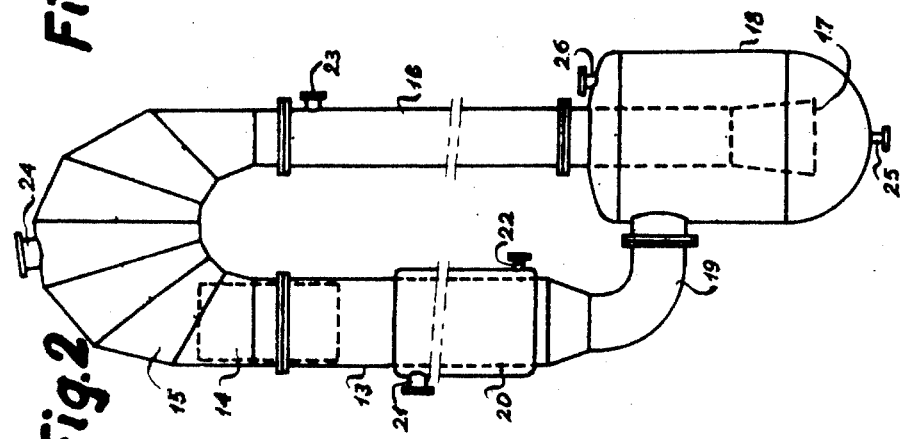

The device shown in FIG. 2 is provided to treat crystallizing solutions heated and superheated in said device. It is similar to that shown in FIG. 1 and its components 13, 14, 15, 16, 17, 18 and 19 respectively correspond to the components 1, 3, 4, 5, 7, 6 and 9 of said FIG. 1; the only differences are that the chamber 15 is made of several sections, the lower part of the recycling pipe 16 is widened at its mouth, and the orifice 17 is located in the area of an hemispherical bottom of the classifying vessel.

Moreover, this device comprises at the lower part of the column 13, a heating jacket 20 with an inlet 21 for the heating steam and an outlet 22 for the condensate.

An inlet 23 is used for feeding the device with liquor to be treated and an outlet 24 for vapor exhaust. A discharge 25 is provided for the crystals drawing off and an outlet 26 for drawing off the decanted liquor as mother-liquid from the vessel 18.

Figure 3:
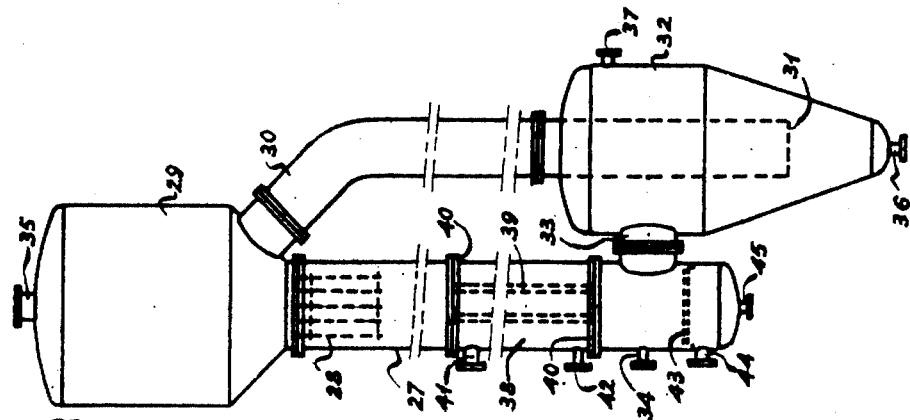
FIGS. 1, 2 and 3 show schematically three embodiments of a crystallization device as per the first alternative of the invention.

In the embodiment shown in FIG. 3, the fluidized bed crystallization device consists of a column 27 containing a vertical wall disperser 28, a chamber 29 for vapor-liquid separation, a recycling tube 30 ending in an orifice 31 located in a classifying vessel 32 with a practically conical bottom, and a junction 33 connecting the vessel 32 and the base of the column 27. An inlet 34 is provided for feeding the device with solution to be treated, an outlet 35 is used for vapor exhaust, a discharge 36 for heaviest crystals draining off, and an outlet 37 for drawing off the mother-liquor decanted in the vessel 32. The column 27 comprises, at its lower part, a heating enclosure comprising a shell 38 containing a bundle of vertical tubes 39 set in plates 40 and heated by a fluid coming through an inlet 41 and leaving the shell through an outlet 42, this enclosure allowing superheating of the liquor in the device itself. In the basement of the column 27 is located a perforated plate 43 set above an inlet 44 usable for introducing a neutral gas saturated with vapors of the treated liquor and relatively compressed.

An outlet 45 allows, in case of stoppage of the device, to discharge the part of the column base which is below the junction 33.

The fluidized bed crystallization device shown in FIG. 4 is designed for concentrating liquors coming in a superheated state to the device.

It consists of a column 46 containing a vertical central tube 47 lying, by means of supports 48 on angle-irons 49, this tube being surrounded, in its upper part, by cylindrical walls 50 of the disperser of the upstream vapor bubbles in the column (see FIG. 7). The interconnection of these walls resting on supports 51 is effected by means of flat-irons 52. The lower part of column 46 is narrowed as a truncated conical shell 53 ending in a cone 53a equipped with a drain 54. Inlets 55 are used for supplying the liquor to be treated and an outlet 56 is used for the decanted mother-liquor discharge into the narrowed part of the column. The outlet 57 at the head of the column allows the exhaust of vapors evolved by liquor.

In the course of the running of the device, the liquid level 58 has to be right above the upper edges of the vertical walls 50 of the vapor bubble disperser.

The device illustrated in FIG. 5 is quite similar to that of FIG. 4, and the components 59–68 are practically identical to the respective components 46, 47, 50–57 shown on said FIG. 4, the cone 53a being replaced by an element 64a which has a substantially hemispherical shape. Moreover, the device of FIG. 5 comprises a heating enclosure composed of a shell 69 equipped with an inlet 70 for the heating vapor inlet and an outlet 71 for the condensate discharge, this enclosure containing a bundle of vertical tubes 72 fixed to plates 73. This device comprises also a bubbler situated between the level of the vertical wall assembly for gaseous bubble dispersion and that of the enclosure for heating, superheating the treated liquor. This bubbler is used to introduce and distribute gas into the liquid content of the column, and is formed by a perforated tubular ring 74 connected to a feeding pipe 75 passing through the inlet 76.

The fluidized bed crystallization device shown in FIG. 6 is similar to that of FIG. 5 and its constituent parts are indicated by the same reference numerals as those of said FIG. 5 but are primed. The difference consists in the arrangement of the bubbler 74'–75' which is here situated between the level of the heating enclosure 69' and the narrowed lower part 64' of the column. Other details somewhat different in comparison with those of FIG. 5 are the upper part of the column which is widened as a tank 59', the cone-shape of the column bottom 64' and the truncated conical end 77 of the recycling tube 60'.

According to FIG. 7, the vertical wall assembly, to have hammering effects avoided and to facilitate the dispersion and impede the interfusion of the upstream gaseous phase bubbles in the liquid content of the column, is composed of 5 cylindrical sections 50 welded by their edges to flat-irons 52, the inside of the section of the smallest diameter being reserved to the liquor recycling conduit.

As illustrated in FIG. 8, the nearly vertical wall assembly for dispersion of the vapor bubbles or gas in the liquid content of the column comprises several parallel flat plates 3. It is realized by means of spaced and bolted tie-rods 78; this assembly may be fixed in the upper part of the column of the device by means of lugs 79.

The heating enclosure is at a level above which the height of the liquid column will exert a hydrostatic pressure sufficient for avoiding the possible boiling of the liquor when in contact with the enclosure heating walls, said level being notably higher than that of the orifice of the recycling pipe in the classifying vessel, the distance between both levels being at least equal to 100 mm., and, in the case of FIGS. 5 to 6, preferably equal to the column daimeter.

It is obvious that, without departing from the scope of the present invention, alterations could be made in the embodiments described. Thus for example, the fluidized bed crystallization device illustrated in FIG. 9, is similar to that of FIG. 2 and its components 13'–19' and 23'–26' correspond respectively to the components 13–19 and 23–26 of FIG. 2, but the enclosure for heating-superheating the treated liquor is different. This enclosure comprises a shell 80 containing a nest of horizontal U-shaped tubes 81 fixed in a tube-plate 82, and provided with a heating fluid inlet 83 and a heating fluid outlet 84.

The device forming the object of this invention, thus described, presents the advantage of making possible the suppressing, during its running, the agitation generated by mechanical equipment, which is relatively expensive in conventional crystallizers utilizing pumps or stirrers, the said advantage resulting from a relatively intense circulation in closed circuit of the liquid phase passed through a gaseous phase released as vapor by the treated solution or introduced as vapor or gas into this solution, this gaseous phase being used at the best of its motive power.

Up to the present it was generally believed that the introduction of a gas into a solution, where a suitable development of crystals is required, was prejudicial because it gives rise to the formation of crystalline germs at the liquor-gaseous phase interface and to the production of different size crystals. In fact, it appears that if a gas, such as air, is saturated with the vapors of the liquid before its introduction and is introduced at a temperature equal or close to, or greater than, the temperature of said liquid, there is no possible concentration of the liquor at the bubble interface, and consequently the danger of producing uneven crystals and crystalline germs in the device forming the subject of the invention is eliminated.

A feature of the device hereinbefore described is that, during its operation, the crystals produced cannot deposit other than in the area of their classification, because, on the one hand, this device contains neither low points other than in this area, nor "dead spaces," i.e. places where the liquor circulation would be largely slowed down, thus facilitating the crystal deposits.

The important economy of this device is also due to its relatively simple manufacture and to the liquid circulation ensured in conformity with the direction of the thermic and natural currents of the treated solution, contrarily to what usually happens in conventional crystallizers.

What I claim is:

1. A fluidized bed crystallization device comprising a column including an upper head and a base and upper and lower parts therebetween inlet means for the liquor to be evaporated and crystallized, an assembly of spaced substantially vertical walls disposed in the upper part of said column for avoiding hydraulic hammer effects in said column and impeding the interfusion of upwardly moving vapor bubbles, a chamber communicating with the head of said column for separating liquid and vapor phases, outlet means in the head of said chamber for the exhaust of separated vapors, a pipe connected to the base of said chamber for recycling liquid separated in said chamber, a vertical classifying vessel communicating with said recycling pipe, said vessel including a lower part narrowed progressively in downward direction and forming a bottom for said vessel, said vessel and said recycling pipe being in communication at a portion above the bottom of said vessel for allowing classification of crystallized grains in suspension in the treated liquor under the action of the liquid current from said pipe in a fluidized bed formed by the crystallized grains in suspension in the liquor in said vessel, outlet means at the bottom of said vessel for the crystalline grains classified as the heaviest grains, outlet means at the head of said vessel for decanted mother-liquor, and means for connecting the head of said vessel to the column base.

2. A fluidized bed crystallization device according to claim 1, wherein the separation chamber has a knee shape and the recycling pipe is disposed outside of the column and penetrates into the classifying vessel substantially coaxially therewith, said vessel including and being connected to the base of the column by a connecting duct, the said device constituting a closed circuit extended in vertical direction.

3. A fluidized bed crystallization device according to claim 1, wherein the recycling pipe is located inside the column and coaxially therewith, the head of the classifying vessel being directly connected to the base of said column to form an entity with said column.

4. A fluidized bed crystallization device according to claim 1, wherein the assembly of vertical walls comprises a plurality of cylindrical walls having different diameters and being concentrically located at the head of the column and at the base of the vapor-liquid separation chamber.

5. A fluidized bed crystallization device according to claim 1, wherein the assembly of substantially vertical walls comprises a plurality of parallel walls at the head of the column and at the base of the vapor-liquid separation chamber.

6. A fluidized bed crystallization device according to claim 1, further comprising means for the forced introduction of a gaseous phase into the column.

7. A fluidized bed crystallization device according to claim 6, wherein the forced introduction means is located below the vertical wall assembly for avoiding hydraulic hammer effects in the liquid contents of the column.

8. A fluidized bed crystallization device according to claim 6, wherein the forced introduction means comprises a perforated tube in the column, a source of the gaseous phase under relative pressure, and a connection between said source and said perforated tube.

9. A fluidized bed crystallization device, according to claim 6, wherein the forced introduction means comprises a perforated plate set in the column below the inlet for the liquor recycled from the classifying vessel, and an inlet for the gaseous phase in said column disposed beneath said perforated plate.

10. A fluidized bed crystallization device according to claim 1, further comprising a heating enclosure at the lower part of the column, at a level above which the height of the liquid column will exert an hydrostatic pressure sufficient for avoiding the possible boiling of the liquor when in contact with the enclosure heating walls, said level being higher than that of the orifice of the recycling pipe in the classifying vessel.

11. A fluidized bed crystallization device, according to claim 10, wherein the heating enclosure is located outside the column of the device and is connected, on the one hand to the column base and, on the other hand, at the head of the classifying vessel, so that, when the device is operating, the treated liquor coming from said vessel is heated and superheated when in contact with the walls of said heating enclosure, and then rises in the column wherein it expands and evaporates.

12. A fluizided bed crystallization device, according to claim 10, wherein the heating enclosure comprises at least one cylindrical heating wall.

13. A fluidized bed crystallization device, according to claim 10, wherein the heating enclosure comprises a cylindrical shell, and a bundle of tubes housed in said shell for heating the treated liquor.

References Cited

UNITED STATES PATENTS

| 880,629 | 3/1908 | Christianson | 127—15 X |
| 1,860,741 | 5/1932 | Jeremiassen | 127—17 X |
| 1,945,281 | 1/1934 | Leithauser | 159—16 X |
| 2,042,488 | 6/1936 | Theiler | 159—16 X |
| 2,426,839 | 9/1947 | Morris | 209—139 X |
| 3,266,556 | 8/1966 | Malek | 159—16 |

FOREIGN PATENTS 1,104,869 11/1955 France.

OTHER REFERENCES

A.R. Thompson: "Crystallizers," Chemical Engineering October 1950, pp. 125–32.

MORRIS O. WOLK, Primary Examiner

D. G. CONLIN, Assistant Examiner

U.S. Cl. X.R.

127—61, 58; 159—16, 24, 43